INVENTOR.
LOUIS H. SEGALL

# United States Patent Office 2,837,698
Patented June 3, 1958

2,837,698
ELECTRICAL APPARATUS

Louis H. Segall, Sidney, N. Y., assignor to Bendix Aviation Corporation, New York, N. Y., a corporation of Delaware Application September 29, 1953, Serial No. 382,965

21 Claims. (Cl. 315—232)

This invention relates to electrical apparatus and more particularly to electrical systems adapted for producing relatively high energy electrical impulses.

One of the objects of the present invention is to provide novel means for controlling the discharge of an electrical condenser, said means being of extremely simple construction.

A further object is to provide a novelly constructed electrical circuit of the above type which is dependable in operation and adapted for use during long periods without danger of operating failures.

Still another object is to provide novel electrical apparatus for producing sparks or arcs, such as for igniting combustible charges in combustion engines of all types.

A still further object is to provide a novel and greatly simplified electrical circuit which is capable of producing sparks or arcs having a very considerable energy between relatively widely spaced electrodes at relatively low voltages.

Another object is to provide electrical apparatus of the condenser discharge type which embodies novel means for producing a series of high energy impulses from a condenser charged step-by-step.

Another object is to provide a novel ignition circuit which embodies only a small number of parts, requires only a small space for installation, and is reliable and efficient in operation.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

Figure 1:
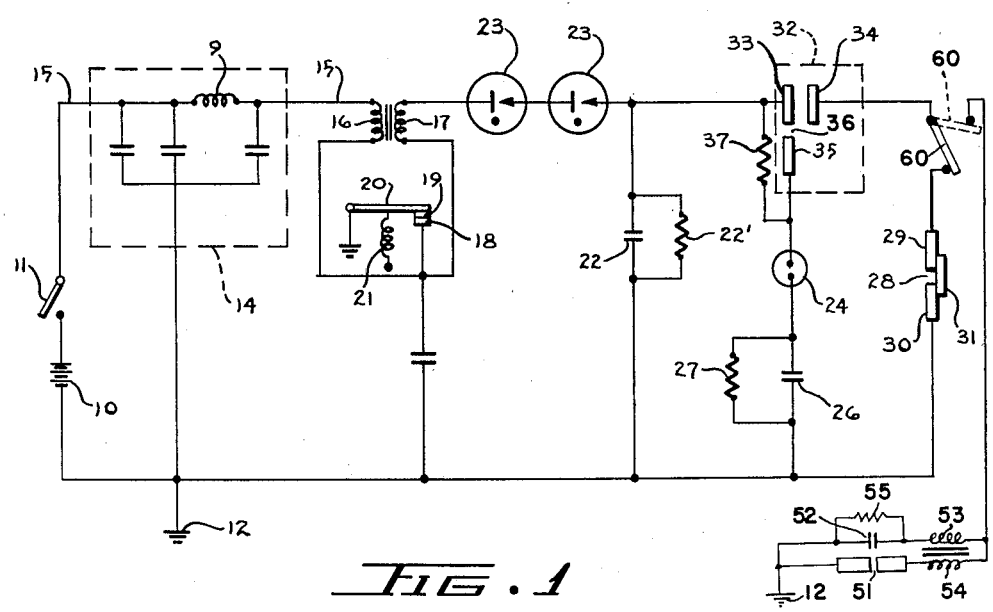
Figure 2:
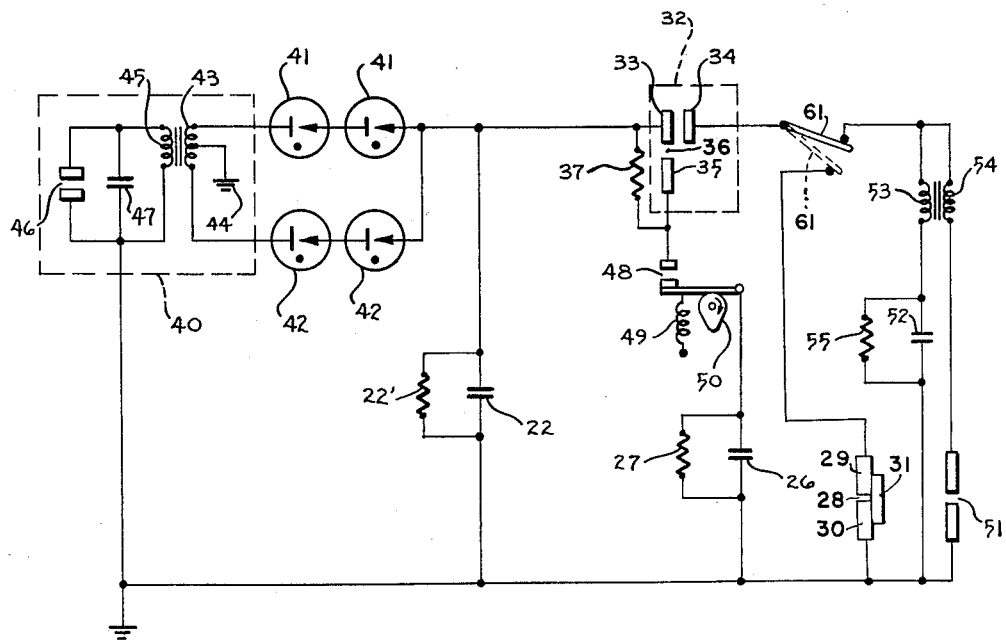

In the drawings, wherein like reference characters refer to like parts throughout the several views, Fig. 1 is a diagram illustrating one form of electrical circuit embodying the invention; and Fig. 2 is a diagram of another form of electrical circuit embodying the invention.

The two embodiments of the invention illustrated in the accompanying drawings, are, by way of example, shown in the form of apparatus or circuits adapted for use as ignition systems in combustion engines including piston engines and so-called jet and gas turbine type engines. The systems shown are capable of producing high energy sparks between rather widely spaced electrodes at relatively low voltages.

As shown in Fig. 1, one suitable embodiment of the invention comprises, as a source of electrical energy, a battery 10 which may be connected to the remainder of the circuit by means of a switch 11 and a ground or equivalent connection 12. It will be understood, however, that other known types of sources of electrical energy may be used, either simultaneously with or alternatively in lieu of the battery. The battery 10 may be of the storage battery type having a 24-volt rating and capable of delivering as much as about 30 volts when connected to a suitable charging means, such as a charging generator. If there is need for it, such as in instances where the source of energy supplies other circuits, suitable filtering means 14 may be provided to prevent radio frequencies from feeding back into circuits emanating from the battery or other source. In the particular embodiment shown, the filtering means comprises three by-pass condensers connected between ground and the power supply line 15, in which there is an inductance 9, but other known types of filters may be used, and in some installations none is necessary.

The battery voltage may be stepped up to a desired higher voltage by any suitable means, such as a vibrator, which may be connected to the battery in any suitable known manner to effect an interrupted current flow. As illustrated, the vibrator includes a transformer comprising a primary winding 16 inductively coupled with a secondary winding 17. The primary winding is connected at one end to power supply lead 15 from one terminal of the battery and at its other end through separable contacts 18, 19 and ground or other suitable return to the other terminal of the battery. Contact 18 is stationarily mounted, whereas contact 19 is mounted on a pivoted or resilient armature 20 to which may be attached a spring 21 for normally holding the contacts in closed or engaged position. When the circuit is closed through contacts 18, 19, electrical current flowing through primary winding 16 creates a magnetic field which is capable of magnetically actuating armature 20 against the efforts of spring 21 to separate said contacts and open or break the primary circuit. The magnetic field then collapses and the spring becomes effective to re-engage contacts 18, 19 to again close the circuit through the battery and primary winding. This cycle of operation is repeated in rapid succession and the interrupted current flow through coil 16 at battery voltage is effective to induce a higher voltage across secondary winding 17.

In the form shown the low potential ends of windings 16, 17 are connected together although winding 17 may be connected independently to ground or, if desired, the windings need not be connected other than inductively. A storage condenser 22 is connected across secondary winding 17 in series with one or more rectifiers 23. The capacity of condenser 22 may vary widely, depending upon the energy required in the igniting spark. For combustion engine uses it has been found suitable to use condensers having capacities ranging from .25 to 5 microfarads. The condenser charging circuit may be completed through ground, or any other suitable connection. The rectifier means may be of the gaseous tube type or of any other suitable known type, such as selenium rectifiers, adapted for passing energy of a selected polarity to storage condenser 22 and for blocking its return flow from the condenser to the transformer. The condenser will thus be charged step-by-step or in successive increments to a voltage determined by the design of the transformer and the voltage of the source of electrical energy. The rectifier means may be dispensed with if the source of electrical energy is of such a nature as to be capable of charging condenser 22 to a desired high voltage by a single impulse or otherwise in such a manner that the condenser is not permitted to discharge back through the charging circuit.

Although it is not necessary, a resistor 22' may be connected across condenser 22 to bleed residual energy therefrom when the system is not in use. This avoids the danger of electrical shocks to personnel working on the system for overhaul or repair. A ten (10) megohm resistor is ample and will not appreciable affect the normal operation.

For the purpose of controlling the discharge of condenser 22 through a load circuit to attain a novel and useful result, there is connected across or in parallel with said condenser a first branch circuit which is novelly constituted to determine or control the voltage at which the storage condenser is permitted to discharge. Said branch or control circuit is connected at one end to the high potential terminal of the storage condenser and comprises a spark gap 36, a control or triggering gap 24, and a small condenser 26 connected in series and a resistor 37 in shunt with the electrodes of gap 36. The return connection to condenser 22 may be through ground or otherwise and preferably a resistor 27 is connected in shunt with condenser 26.

Gap 36 comprises spaced electrodes 33, 35 and the width of the gap between said electrodes is such that the normal spark-over voltage thereof is less than the voltage of the maximum charge impressed upon storage condenser 22 which is in turn determined by the break-down or spark-over voltage of gap 24. The gap 36 is preferably but not necessarily sealed in an envelope 32 with an output electrode 34 which forms with electrode 33 a hold-off spark gap 33, 34, the purpose of which is more fully discussed below. The resistance 37 which performs a purpose or function to be hereinafter discussed is preferably quite large, such as on the order of 0.1 to 10 megohms.

Spark gap 24 is designed to have a relatively predetermined or constant break-down or spark-over voltage and is accordingly preferably of the sealed type, so that the spark-over or break-down voltage thereof remains substantially constant and independent of surrounding pressures and other atmospheric conditions at different altitudes. In the novel system contemplated by the present invention, said predetermined break-down voltage of gap 24 should be approximately the same as or greater than the normal break-down or spark-over voltage of gap 36. One type of spark gap which has been found suitable for use as gap 24 is disclosed in Linkroum et al. U. S. Patent No. 2,540,399. The capacity of condenser 26 is preferably small in comparison to that of storage condenser 22 so that only a relatively small amount of energy from the storage condenser is required to fully charge it. Accordingly, the current carrying burden placed upon control or triggering gap 24 is minimized and the life and efficiency thereof are substantially increased. This makes possible the use of a relatively delicate or sensitive low-voltage control gap while simultaneously improving the durability and dependability of the system as a whole. The resistance 27 is effective to bleed off or absorb any residual charge on condenser 26 after each cycle of operation of the system in the manner to be hereinafter explained. Resistor 27 also dissipates any energy which may leak past control gap 24 during the charging of condenser 22 to the break-down voltage of said gap to thereby insure a constant or pre-determined flow of energy from condenser 22 to condenser 26 during each cycle of operation.

In the circuit thus far described, it will be seen that during the charging of condenser 22 the voltage potential is the same at all points in the circuit between the high potential side of said condenser and control gap 24. Accordingly when condenser 22 has been charged to the break-down voltage of the control gap 24, said condenser will start to discharge through resistor 37 and across gap 24 into condenser 26. At this instant the potential difference across the terminals of gap 36 becomes approximately equal to or closely approaches the voltage of the charge on condenser 22, since the impedance of resistor 37 is very high in comparison with the remainder of the impedance in the circuit comprising said resistance, gap 24 and condenser 26. This potential difference across electrodes 33, 35 being higher than the break-down voltage of gap 36, the discharge from condenser 22 seeks the path of least resistance across said gap. Thus, the initial discharge of the storage condenser is through resistor 37 but a major portion of the discharge required to fully charge condenser 26 takes place across gap 36 as a spark or arc. The spark discharge across this gap is effective to ionize the gases in the space between electrodes 33 and 34.

The major portion of each charge built up on storage condenser 22 is discharged through and utilized in a second branch or sparking circuit which is also connected across or in parallel with said storage condenser. This second branch includes an energy-consuming load which in the illustrated embodiment is a spark or igniter gap 28 that comprises spaced electrodes 29 and 30 and may be in the form of a spark plug or igniter plug of the type used in ignition systems for combustion engines. As shown in Fig. 1 the gap 28 is of the type which is bridged by a high resistance or a semi-conductor 31 to facilitate the formation of a high energy spark or arc across the electrodes of the gap at relatively low voltage. One suitable form of igniter plug or device embodying a gap thus bridged is disclosed in co-pending U. S. application Serial No. 221,435, filed April 17, 1951, now U. S. Patent No. 2,786,158. The bridged igniter gap is of the type now commonly referred to in the art as a "shunted surface spark gap."

Connected in series with igniter gap 28 in the sparking circuit is the hold-off spark gap comprising the spaced input and output electrodes 33 and 34, respectively. This spark gap is also preferably but not essentially of the sealed type and segregates the igniter gap from the storage condenser while the latter is being charged to the desired voltage. The normal spark-over voltage of gap 33, 34 is somewhat greater than the spark-over voltage of control gap 24 and hence, greater than the maximum voltage to which condenser 22 is normally charged. The hold-off gap is rendered conductive to the charge on the storage condenser by the above described partial discharge of said condenser across gap 36. Such a partial discharge is effective to ionize the gaseous medium within envelope 32 sufficiently to lower the spark-over voltage of the hold-off gap 33, 34 to the level of the voltage of the charge on the storage condenser.

In one practical embodiment of the above described circuit or system, the source of electrical energy may, as pointed out above, comprise a standard 24-volt storage battery which, when the ignition switch 11 is closed, causes current to flow through primary winding 16 and the normally closed vibrator contacts 18, 19. As further pointed out above, the operation of the vibrator contacts results in the flow of interrupted direct current through primary winding 16 which induces a higher voltage across secondary winding 17. The vibrator transformer may be designed to produce any of a wide range of secondary voltages. For the ignition system of a present-day jet type engine, it has been found that a secondary voltage of about 2,500 to 3,500 volts is desirous in a system such as that shown in Fig. 1. Energy is thus caused to flow through rectifier means 23 in pulses to charge storage condenser 22 in increments or step-by-step to a voltage of about 2,500 to 3,500 volts or other chosen voltage. Each of the rectifiers has a selected hold-off voltage and the sum of these voltages should be in excess of the maximum charge desired on the storage condenser to prevent the latter from discharging back through secondary winding 17. Transformer 16, 17 may be a step-up transformer having a ratio of about 3 to 1 and resistors 27 and 55 may each have a value of about .1 megohm.

The sealed control gap 24 is so designed that when the storage condenser attains a charge of about 2,500 volts or other selected voltage, the gap will become conductive and as described above, permits a partial discharge of condenser 22 into condenser 26. This small condenser acquires a full charge very rapidly without absorbing any appreciable percentage of the charge built up on condenser 22. For example, the storage condenser may have a capacity of from about .25 to about 6 microfarads, whereas the capacity of the condenser 26 may be as little as .01 to .03 microfarad. Accordingly, the flow of current across control gap 24 is small and of short duration so the resultant deterioration of the gap electrodes is relatively small, thereby increasing the effective life thereof. When the gap 24 becomes conductive the initial energy discharged from the storage condenser through resistance 37 is effective in the manner above described to create a potential difference across gap 36 so that the same breaks down and carries a major part of the discharge from condenser 22 to condenser 26. This results from the fact that the gap 36 is designed to break down at a voltage lower than the break-down voltage of gap 24 and hence lower than the then available voltage on condenser 22. The discharge across gap 36 is effective to ionize the gaseous medium in envelope 32 between hold-off gap electrodes 33, 34. The breakdown or spark-over voltage of the latter gap is thus reduced so that the gap becomes conductive at the voltage then existing across condenser 22. The latter will accordingly discharge the major portion of its charge across the hold-off gap to the shunted surface igniter gap 28. The normal break-down voltage of the spark gap between electrodes 29 and 30 may be materially greater than the voltage to which condenser 22 is charged, but initially a small amount of energy from the condenser passes through or along the surface of element 31 between the electrodes. This flow of energy is apparently effective to ionize the gaseous medium of the gap between electrodes 29, 30 and thereby reduce the resistance of said medium so that the condenser will discharge across the gap and create an arc of very considerable energy at a relatively low voltage considering the width of the gap. The spark gap 28 may be of such width that in the absence of resistor 31, a voltage in excess of 4,000 volts or more would be required to bridge it and hence create a spark at atmospheric pressure.

The sparking rate at gap 28 may be determined with a reasonable degree of accuracy by properly designing the various elements of the system, such as the vibrator, transformer, rectifiers, condensers, etc. It will be understood, of course, that the sparking rate will vary with changes in the source voltage, but this variation may be countered or reduced to a substantial extent by properly designing the vibrator transformer 16, 17 in the light of the known variation in the source voltage. This is accomplished by designing the transformer to operate at the available voltages along the so-called knee of the magnetization curve of the transformer core, which may be of the air gap type to thereby give good energy transfer without excessive variation.

During each cycle of operation some of the charge attained by condenser 26 may be discharged across gap 33, 34 and the igniter gap 28 while these two gaps are conducting the discharge of condenser 22. Any residual charge remaining on condenser 26 at the end of each cycle of operation as well as any energy which may leak past control gap 24 during the charging of the storage condenser is dissipated by resistor 27. Upon initiation of each discharge of condenser 22 through the control gap, the condenser 26 will be at substantially zero potential, thus assuring a maximum voltage differential between the two condensers.

In the embodiment or modification shown in Fig. 2, a magneto 40 is provided as the source of electrical energy for repeatedly charging storage condenser 22 through two sets of rectifiers 41 and 42 in a manner well understood in the art. The secondary winding 43 of the magneto coil has a center tap which is grounded at 44 so that current of one polarity flows through rectifiers 41 and current of opposite polarity flows through rectifiers 42 to charge condenser 22 step-by-step or in small increments. The primary winding 45 of the magneto coil is connected in circuit in the usual manner with a circuit breaker 46 which may be cam operated and across which is connected a condenser 47.

The energy stored in condenser 22 may be intermittently released in the same manner as described above in connection with the embodiment of Fig. 1; that is, under the control of a control spark gap in circuit with resistance 37 and condenser 26. However, if accurately timed impulses are desired the spark gap may be replaced by a contactor 48 which is normally held in open position by a spring 49 and is intermittently closed by a rotatably driven cam 50. When contactor 48 is closed, condenser 22 will partially discharge into condenser 26 and the resultant operation of the system is the same as that described above in connection with the circuit of Fig. 1. If desired one set of the rectifiers 41, 42 may be dispensed with, but in that event the storage condenser will be charged only about half as fast.

That portion of the circuit of Fig. 2 connected to the output electrode 34 of the hold-off spark gap device 32 may comprise a shunted-surface type spark plug or igniter plug 29—31 when a selector switch 61 is in its illustrated dotted line position. Alternatively, when switch 61 is in its illustrated full line position, one branch of two parallel circuits connected to the output terminal 34 of the hold-off spark gap includes a high voltage spark or igniter gap 51 of the more usual or better known high tension type wherein the electrodes are wholly insulated from one another. In modern engines a spark gap of this type is usually designed to have a normal spark-over voltage of about 15,000 volts in the combustion chamber of an engine, i. e., a voltage which may be several times greater than the selected maximum voltage across condenser 22. Accordingly, igniter gap 51 must be first ionized to permit the lower voltage charge from the storage condenser to flow across the same for creating the high energy ignition spark. This is accomplished by connecting the output side of gap 33, 34 to parallel branches or circuits, one of which includes a condenser 52 that is of small capacity in comparison to storage condenser 22 and is connected in series with the primary winding 53 of a step-up transformer. The capacity of condenser 52 may be comparable to that of condenser 26. The other said branch or circuit includes the secondary winding 54 inductively coupled with primary winding 53 and the igniter gap 51 in series. For dissipating residual energy on condenser 52 after each operation of the circuit, there is provided in shunt therewith a resistor 55.

When hold-off gap 33, 34 is rendered conductive in the manner described above, the voltage is insufficient to bridge gap 51, and hence, the initial flow of energy is into condenser 52 and through primary winding 53. The small condenser 52 is charged very rapidly and the charging current which flows through primary winding 53 rises very rapidly or abruptly to a relatively high peak value and induces a sufficiently high voltage across secondary winding 54 to impress a spark across the electrodes and thus ionize or trigger igniter gap 51. The spark-over voltage of this gap is thus reduced so that the remainder of the charge on condenser 22 finds the path of least resistance across the ionized igniter gap and creates the high energy spark or arc which contains the desired amount of heat for igniting the combustible charge in the engine. The major portion of the charge on condenser 52 will also be discharged across the igniter gap with the main charge from the storage condenser. Any residual charge on condenser 52 after gap 51 ceases to be conductive will be dissipated by resistor 55 thus insuring a maximum voltage differential between condensers 22 and 52 when hold-off gap 33, 34 becomes conductive.

If a plurality of igniter gaps 28 or 51 are required to be fired in succession or in timed relation, a suitable distributor of known construction may be inserted at a suitable place in either circuit and parts on the output side of the distributor, including the igniter gaps, may be increased in accordance with the number of igniter gaps required. It will also be apparent that the shunted surface type of igniter gap employed in the embodiment of Fig. 1 may be replaced by that portion of the circuit of Fig. 2 which is connected to the output terminal of hold-off spark gap device in envelope 32. This alternative embodiment which includes elements 51 to 54, inclusive, is illustrated in Fig. 1 and may be connected, in lieu of igniter gap 28, to spark gap terminal 34 by means of a switch 60. Additionally in some installations, the output terminal of the spark gap device in envelope 32 may be connected directly to a sparking device having insulated electrodes so mounted that the normal spark-over voltage thereof does not exceed the voltage of the charge on the storage condenser. It will also be understood that gap 33—35 may be of the shunted surface gap type having a high resistance or semi-conductor bridging the electrodes 33, 35 in the manner and for the purpose described in the copending application of Tullio Tognola, Serial No. 349,444, filed April 17, 1953.

Although only a limited number of embodiments and modifications of the invention have been illustrated in the accompanying drawing and described in the foregoing specification, it is to be expressly understood that the invention is not so limited, but may be embodied in other specifically different circuits. For example, other well-known sources of interrupted, pulsating, direct or alternating current may be provided in lieu of the magneto or battery-vibrator combination illustrated, such as a D. C. or A. C. generator, and other suitable types of rectifiers known to the art may be utilized in lieu of the type illustrated and specifically mentioned. Additionally, the various parts of the circuit, particularly many of the parts which are series connected, may be rearranged with respect to each other without appreciably affecting the operation of the circuit. Various other changes may also be made, such as in the electrical values suggested herein, by way of example, without departing from the spirit and scope of the invention, as the latter will now be understood by those skilled in the art.

What is claimed is:

1. In an electrical apparatus, a source of electrical energy including a storage condenser, a second condenser, and means connecting said source and said second condenser including a spark gap and resistance in parallel and a control gap connected in series with said spark gap and second condenser, the spark-over voltage of said spark gap being no greater than the spark-over voltage of the control gap and said resistance being spaced from the electrodes of said spark gap.

2. Electrical apparatus as defined in claim 1 comprising a hold-off spark gap and an igniter gap connected in series across said storage condenser, said hold-off gap and said first-named spark gap having a common electrode.

3. Electrical apparatus as defined in claim 2 wherein said igniter gap is a shunted surface spark gap.

4. Electrical apparatus as defined in claim 2 comprising the secondary winding of a transformer connected in series with said igniter gap, and the primary winding of said transformer and a condenser connected in series across said secondary winding and said igniter gap.

5. An electrical system comprising a storage condenser, a source of electrical energy connected with said condenser for charging the same to a pre-determined voltage, a sparking circuit comprising a shunted surface igniter gap and a hold-off spark gap in series across said condenser, said hold-off spark gap having spaced input and output electrodes and being normally non-conductive to the charge attained by said condenser, and a control circuit comprising in series across said condenser a first control gap including said input electrode, a second control gap which is conductive at said pre-determined voltage to which said condenser is charged and a second condenser which is of small capacity in comparison to said storage condenser and a resistance in shunt with said first control gap, the latter being conductive at a voltage not in excess of said pre-determined voltage.

6. In an electrical system, a storage condenser, a source of electrical energy for charging said condenser, a sparking circuit comprising an igniter gap and a hold-off gap connected in series across said condenser, the normal spark-over voltage of said hold-off gap being greater than the maximum voltage of the charge attained by said condenser, and means including a control gap, a spark gap and a second condenser connected in series across said storage condenser and a resistance connected in shunt with and remote from the electrodes of said spark gap for rendering said hold-off gap conductive to the charge on said condenser.

7. An electrical system as defined in claim 6 wherein said hold-off gap and said spark gap have a common electrode.

8. In an electrical circuit, a storage condenser, means for charging said condenser, means for controlling the discharging of said condenser comprising a spark gap, a control gap and a second condenser connected in series across said storage condenser and a resistance connected in shunt with the electrodes of said spark gap, said control gap being conductive through said resistance at a pre-determined voltage to which said storage condenser is charged by said charging means, the normal spark-over voltage of said spark gap being not greater than said pre-determined voltage, and a load circuit connected across said storage condenser comprising a hold-off spark gap having a normal spark-over voltage in excess of said pre-determined voltage, said first-named spark gap and said hold-off gap having a common electrode connected to said storage condenser.

9. An electrical circuit as defined in claim 8 wherein the load circuit comprises a shunted surface spark gap in series with said hold-off gap.

10. An electrical circuit as defined in claim 8 comprising an igniter gap and the secondary winding of a transformer in series with said hold-off gap in said load circuit, and means including a third condenser and the primary winding of said transformer connected in series with said hold-off gap across said storage condenser, said third condenser being of small capacity as compared to the capacity of said storage condenser.

11. In electrical apparatus, a source of electrical energy, a storage condenser connected to be charged by said source, a second condenser of less capacity than said storage condenser, and means for electrically connecting said condensers, said means including a spark gap, a resistance spaced from and connected in shunt with the electrodes of said spark gap and a control gap for completing a circuit through said condensers and said resistance whenever the voltage across the storage condenser reaches the spark-over voltage of said control gap, whereby said storage condenser discharges across the spark gap and the control gap into said second condenser, said spark gap having a normal spark-over voltage which is no greater than the spark-over voltage of the control gap.

12. In electrical apparatus, a storage condenser, means for charging said condenser, a hold-off spark gap and a second spark gap having a common electrode, means including a control gap for connecting the electrodes of said second spark gap to opposite terminals of said condenser, a resistance connected in shunt with the electrodes of said second spark gap, and an electrical load connected to the other electrode of the hold-off gap.

13. Electrical apparatus as defined in claim 12 wherein the electrical load comprises a shunted surface spark gap.

14. Electrical apparatus as defined in claim 12 wherein the electrical load comprises first and second branch circuits connected in parallel, said first branch including a condenser of smaller capacity than said storage condenser and the primary winding of a transformer and said second branch comprising an igniter gap and the secondary winding of said transformer.

15. In electrical apparatus, a source of electrical energy, a spark gap, a resistance connected in shunt with the electrodes of said spark gap, means connecting one electrode of said gap to one terminal of said source, and means for connecting the other electrode of said gap to the other terminal of said source, said connecting means including a condenser and a spark gap having a normal spark-over voltage at least as high as the normal spark-over voltage of said first-named spark gap.

16. In electrical apparatus, a source of electrical energy including a storage condenser, and circuit means connected to said storage condenser comprising a first branch including a spark gap, a second condenser of smaller capacity than said storage condenser and an intermittently operable contactor connected in series across said storage condenser, and a resistance in shunt with said spark gap, a second branch comprising a hold-off spark gap, the primary winding of a transformer and a third condenser connected in series across said storage condenser, said first-named spark gap and said hold-off gap having a common electrode, and a third branch comprising the secondary winding of said transformer and an igniter gap connected across said primary winding and said third condenser.

17. In electrical apparatus, a storage condenser, means for charging said condenser, a hold-off spark gap and a second spark gap having a common electrode, means including a second condenser for intermittently operatively connecting the electrodes of said second spark gap to opposite terminals of said storage condenser, said second condenser being of small capacity as compared to the capacity of said storage condenser, a resistance connected in shunt with the electrodes of said second spark gap, and an electrical load connected to the other electrode of the hold-off gap.

18. Electrical apparatus as defined in claim 17 wherein said connecting means includes a control spark gap in series with said second condenser.

19. Electrical apparatus as defined in claim 17 wherein said connecting means includes an intermittently operable contactor in series with said second condenser.

20. Electrical apparatus as defined in claim 17 wherein the electrical load comprises a shunted surface spark gap.

21. Electrical apparatus as defined in claim 17 wherein the electrical load comprises first and second branch circuits connected in parallel, said first branch including a condenser of smaller capacity than said storage condenser and the primary winding of a transformer, and said second branch comprising an igniter gap and the secondary winding of said transformer.

References Cited in the file of this patent

UNITED STATES PATENTS

| | | |
|---|---|---|
| 2,416,971 | Welch | Mar. 4, 1947 |
| 2,447,377 | Tognola et al. | Aug. 17, 1948 |
| 2,470,413 | Ramsay | May 17, 1949 |
| 2,508,954 | Latour et al. | May 23, 1950 |
| 2,551,101 | Debenham | May 1, 1951 |
| 2,571,788 | Tognola | Oct. 16, 1951 |
| 2,651,005 | Tognola | Sept. 1, 1953 |